(12) United States Patent
Nishio et al.

(10) Patent No.: US 11,673,522 B2
(45) Date of Patent: Jun. 13, 2023

(54) VEHICLE FRONT BUMPER AND VEHICLE-BODY STRUCTURE INCLUDING THE SAME

(71) Applicant: Mazda Motor Corporation, Hiroshima (JP)

(72) Inventors: Nobuya Nishio, Hiroshima (JP); Hiroshi Mizuguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 17/494,837

(22) Filed: Oct. 6, 2021

(65) Prior Publication Data

US 2022/0111809 A1 Apr. 14, 2022

(30) Foreign Application Priority Data

Oct. 13, 2020 (JP) .............................. JP2020-172737

(51) Int. Cl.
*B60R 19/18* (2006.01)
*B60R 21/34* (2011.01)
*B60R 19/02* (2006.01)

(52) U.S. Cl.
CPC ............ *B60R 19/18* (2013.01); *B60R 19/023* (2013.01); *B60R 21/34* (2013.01); *B60R 2019/1806* (2013.01); *B60R 2019/1886* (2013.01)

(58) Field of Classification Search
CPC ....... B60R 19/18; B60R 21/34; B60R 19/023; B60R 2019/1806; B60R 2019/1886
See application file for complete search history.

(56) References Cited

U.S. PATENT DOCUMENTS

| 11,465,688 B2 * | 10/2022 | Aizawa ................ B62D 21/155 |
| 11,479,194 B2 * | 10/2022 | Aizawa .................. B60R 19/50 |
| 2014/0084608 A1 | 3/2014 | Hasegawa et al. |

FOREIGN PATENT DOCUMENTS

| CN | 108454556 A | * | 8/2018 | ............ B60R 19/52 |
| JP | 2014-69591 A | | 4/2014 | |

* cited by examiner

*Primary Examiner* — Dennis H Pedder
*Assistant Examiner* — Melissa Ann Bonifazi
(74) *Attorney, Agent, or Firm* — Xsensus LLP

(57) ABSTRACT

A front bumper includes a bumper fascia, an upper panel, and a shock absorbing member and a rigidity member in the interior of the upper panel. The shock absorbing member is formed in a hat shape in cross section by a front wall, an upper wall (a front-side upper wall and a rear-side upper wall), a rear wall, and a lower wall. The rigidity member includes an upper end portion fixed to the upper wall, a lower end portion fixed to the lower wall, and an intermediate portion connecting the upper end portion and the lower end portion in the vehicle up-down direction. The intermediate portion is spaced apart from the rear wall in the vehicle front-rear direction.

12 Claims, 6 Drawing Sheets

VEHICLE FRONT BUMPER AND VEHICLE-BODY STRUCTURE INCLUDING THE SAME

CROSS-REFERENCE TO RELATED APPLICATIONS

The present application claims priority to Japanese application number 2020-172737 filed in the Japanese Patent Office on Oct. 13, 2020, the entire contents which are incorporated herein by reference.

TECHNICAL FIELD

The present disclosure relates to a shock absorbing structure for pedestrian protection is provided inside an upper panel covering the upper side of a bumper fascia in the vehicle width direction on the front side relative to a vehicle bonnet.

BACKGROUND

Conventionally, there has been considered an energy absorbing structure in a vehicle upper panel or a bonnet upper portion for the purpose of pedestrian protection.

For example, there has been proposed, in the case where a thigh of a pedestrian collides with an upper panel from the obliquely upper side of the vehicle front side or in the case where a head of a pedestrian collides with a bonnet front end portion from the obliquely upper side of the vehicle front side, achieving energy absorption through deformation of a vehicle component (a shock absorbing member for pedestrian protection) at the collision section and thereby reducing the shock to the pedestrian (see, for example, Patent Literature 1).

CITATION LIST

Patent Literature

[Patent Literature 1] Japanese Patent Laid-Open No. 2014-69591

SUMMARY

Problems to be Solved

According to a vehicle-body front structure described in Patent Literature 1, the shock absorbing member for pedestrian protection is deformed with respect to a collision load input from the obliquely upper side of the vehicle front side, so that the shock at the time of the collision can be reduced. However, no consideration is made about situations where a load is input from a plurality of directions such as the vehicle front side and the vehicle upper side and where rigidity is secured such that no deformation occurs.

Specifically, in a vehicle having a large body size such as an SUV having a relatively high vehicle height, the height from the ground to a bonnet upper face is high, and a thigh of a pedestrian almost perpendicularly collides with the vehicle from the front side. Furthermore, in the case where a child pedestrian is assumed, a head of the pedestrian collides with an upper panel on the bonnet front side from the obliquely upper side of the vehicle front side. Thus, the position and direction of a collision load input to a vehicle front portion change according to body size; accordingly, energy absorption needs to be achieved with respect to the input load in a plurality of directions.

The present inventors have conducted earnest studies regarding a structure of providing a shock absorbing member capable of absorbing energy through deformation of sections colliding with a thigh and a head from the viewpoint of pedestrian protection. A load in the case where a collision with a thigh is assumed has a load vector in the front-rear direction with respect to the vehicle. On the other hand, a load in the case where a collision with a head is assumed has a load vector in the up-down direction with respect to the vehicle and a load vector in the front-rear direction with respect to the vehicle. Accordingly, the load vector in the front-rear direction is common in collisions with a head and a thigh, and the shock absorbing member needs to have a structure capable of deformation with respect to the load vector in the front-rear direction.

On the other hand, it is assumed that a worker, when performing maintenance inside an engine room while opening a bonnet, places his/her weight on an upper panel from the vehicle upper side, and thus a certain rigidity or more needs to be secured in the upper panel with respect to the load vector in the up-down direction. However, only using a material having a simply high rigidity for the shock absorbing member might hinder deformation in the front-rear direction.

That is, a front bumper is required to have both of a low rigidity that allows energy absorption through deformation with respect to a load from the vehicle front side and a load from the obliquely upper side of the front side at the time of collision, and a high rigidity that does not allow deformation with respect to a load from the vehicle upper side.

Means for Solving the Problems

Accordingly, the present inventors have invented a structure for a vehicle front bumper inside an upper panel which does not hinder deformation with respect to a load in the front-rear direction and which secures a sufficient rigidity with respect to a load in the up-down direction so as to have both of a low rigidity with respect to a load from the front side and a load from the obliquely upper side and a high rigidity with respect to a load from the upper side.

Specifically, a vehicle front bumper including a bumper fascia provided in a vehicle front face, an upper panel provided on the upper side of a center portion of the bumper fascia, and a shock absorbing member and a rigidity member which are provided in the interior of the upper panel, wherein the shock absorbing member is formed in a hat shape in cross section by a front wall extending toward the vehicle upper side over the vehicle width direction, an upper wall extending toward the vehicle rear side from an upper portion of the front wall, a rear wall extending toward the vehicle lower side from a rear portion of the upper wall, and a lower wall extending toward the vehicle rear side from a lower portion of the rear wall, and the rigidity member includes an upper end portion fixed to the upper wall, a lower end portion fixed to the lower wall, and an intermediate portion connecting the upper end portion and the lower end portion in the vehicle up-down direction, and the intermediate portion is spaced apart from the rear wall in the vehicle front-rear direction.

According to the one or more embodiments, in the case where a thigh of a pedestrian collides with the vehicle from the front side, the front wall of the shock absorbing member is deformed toward the rear wall on the vehicle rear side, thereby absorbing the shock. A space is provided between the front wall and the rear wall, and the rear wall does not prevent deformation of the front wall toward the vehicle rear side. Furthermore, the intermediate portion of the rigidity member is spaced apart from the rear wall. Thus, the rigidity member also allows deformation of the front wall toward the vehicle rear side.

In the case of a collision with a head from the obliquely upper side of the vehicle front side, the front wall and the rear wall in the shock absorbing member having a hat shape in cross section are deformed so as to fall toward the vehicle rear side, thereby absorbing the shock. The intermediate portion of the rigidity member is spaced apart from the rear wall in the front-rear direction. Thus, the intermediate portion does not prevent deformation of the front wall and the rear wall of the shock absorbing member toward the vehicle rear side. Furthermore, in the case where the intermediate portion of the rigidity member is pushed rearward by the rear wall deformed toward the vehicle rear side, the intermediate portion is also deformed to fall from the lower end portion. The rigidity member allows deformation in the front-rear direction.

On the other hand, the upper end portion of the rigidity member is fixed to the upper wall of the shock absorbing member. Thus, a load in the up-down direction via the upper panel at the time of an operation or the like is input to the rigidity member. The intermediate portion of the rigidity member is spaced apart from the rear wall of the shock absorbing member in the front-rear direction, and thus the rear wall and the upper end portion and the intermediate portion of the rigidity member form a closed cross-section. The rigidity member and the shock absorbing member can exhibit a high rigidity with respect to a load in the up-down direction.

Accordingly, the structure for the vehicle front bumper is realized which has both of the low rigidity with respect to a load from the front side and a load from the obliquely upper side and the high rigidity with respect to a load from the upper side.

In the front bumper, in order to promote deformation of the intermediate portion of the rigidity member toward the vehicle rear side using the lower end portion as a starting point, the rigidity member may extend in the vehicle width direction along the shock absorbing member, the intermediate portion may extend in a face shape in the vehicle up-down direction, the lower end portion may extend in a face shape toward the vehicle rear side, and the intermediate portion and the lower end portion may be connected via a bent portion.

According to the one or more embodiments, when the rear wall of the shock absorbing member is deformed so as to fall toward the vehicle rear side, the rear wall contacts the intermediate portion and transfers a load toward the vehicle rear side, so that the intermediate portion can be easily deformed toward the vehicle rear side using the bent portion as a starting point with respect to the lower end portion.

In the front bumper, in order to further facilitate deformation at the bent portion in the front-rear direction, a cutout may be formed in the bent portion.

According to the one or more embodiments, a load to cause the intermediate portion to be deformed toward the vehicle rear side can be further reduced by the cutout provided in the bent portion, and the shock absorbing member can be easily deformed without hindrance to deformation in the front-rear direction.

In the front bumper, regarding a load vector in the vehicle front-rear direction due to a collision with a thigh or a head, in order to efficiently transfer to the rear wall and the rigidity member an input load from the front wall and not to hinder deformation of the shock absorbing member in the vehicle front-rear direction, the shock absorbing member may be formed by a front-side shock absorbing member and a rear-side shock absorbing member, and the front-side shock absorbing member and the rear-side shock absorbing member may be superimposed on each other at the upper wall and fixed together with the upper end portion.

According to the one or more embodiments, when a load is input to the front wall of the front-side shock absorbing member, the load is input to the upper end portion of the rigidity member. As a result, a bending moment toward the vehicle rear side occurs in the bent portion of the rigidity member, and the rigidity member can be easily deformed toward the vehicle rear side using the bent portion as a starting point. Furthermore, similarly in the rear-side shock absorbing member, a load input to the front wall of the front-side shock absorbing member is input to the rear-side shock absorbing member through the upper wall, and thus a bending moment toward the vehicle rear side occurs in the lower end portion of the rear wall. As a result, the rear-side shock absorbing member can be also easily deformed.

In the front bumper, to efficiently absorb an input load from the vehicle front side, it is effective to make best use of a distance (energy absorbing stroke) in which sequential deformation is made from the vehicle front side to achieve energy absorption. To achieve efficient energy absorption, the plate thickness of the front-side shock absorbing member may be smaller than the plate thickness of the rear-side shock absorbing member.

According to the one or more embodiments, the front-side shock absorbing member is more easily deformed than the rear-side shock absorbing member. At the time of a collision with a thigh, the front-side shock absorbing member is deformed while moving toward the vehicle rear side, so that the front-side shock absorbing member can be reliably deformed and the load right after the collision can be reduced. Furthermore, at the time of a collision with a head, the front-side shock absorbing member is deformed to fall toward the vehicle rear side, so that a large area of the head contacts the upper wall of the shock absorbing member and the collision load can be dispersed. Furthermore, a load input to the front-side shock absorbing member is transferred to the rear-side shock absorbing member, and both of the front-side shock absorbing member and the rear-side shock absorbing member are deformed so as to fall toward the vehicle rear side, so that the energy absorbing stroke can be made long diagonally with respect to the shock absorbing member having a hat shape in cross section, and the shock to the pedestrian can be reduced.

In a vehicle-body structure including the front bumper, in addition to absorbing a shock at the time of collision by means of the shock absorbing member provided inside the upper panel, to achieve energy absorption in a manner involving the vehicle-body structure, the vehicle-body structure disclosed herein includes a bumper support portion supporting the front bumper, wherein the bumper support portion has one end fixed to a vehicle-body upper frame extending in the vehicle width direction on the vehicle rear side relative to the shock absorbing member, and has another end fixed to the front bumper at a position away from the upper frame toward the vehicle front side.

According to one or more embodiments, the front bumper is, in a cantilever state, fixed to the bumper support member extended toward the vehicle front side from the vehicle-body upper frame, and thus the bumper support member bends in association with a shock to the upper panel, so that absorption of shock energy can be achieved in a manner involving the vehicle-body structure.

Advantageous Effects

According to one or more embodiments, for the purpose of pedestrian protection, a structure having both of a low rigidity that allows energy absorption through deformation at the time of collision with respect to a load from the vehicle front side and a load from the obliquely upper side of the front side, and a high rigidity that does not allow deformation with respect to a load from the vehicle upper side may be realized.

DETAILED DESCRIPTION

Hereinafter, embodiments in a vehicle front bumper and a vehicle-body structure will be described with reference to the drawings. The vehicle-body front bumper and the vehicle-body structure described herein are illustrative.

Figure 1:
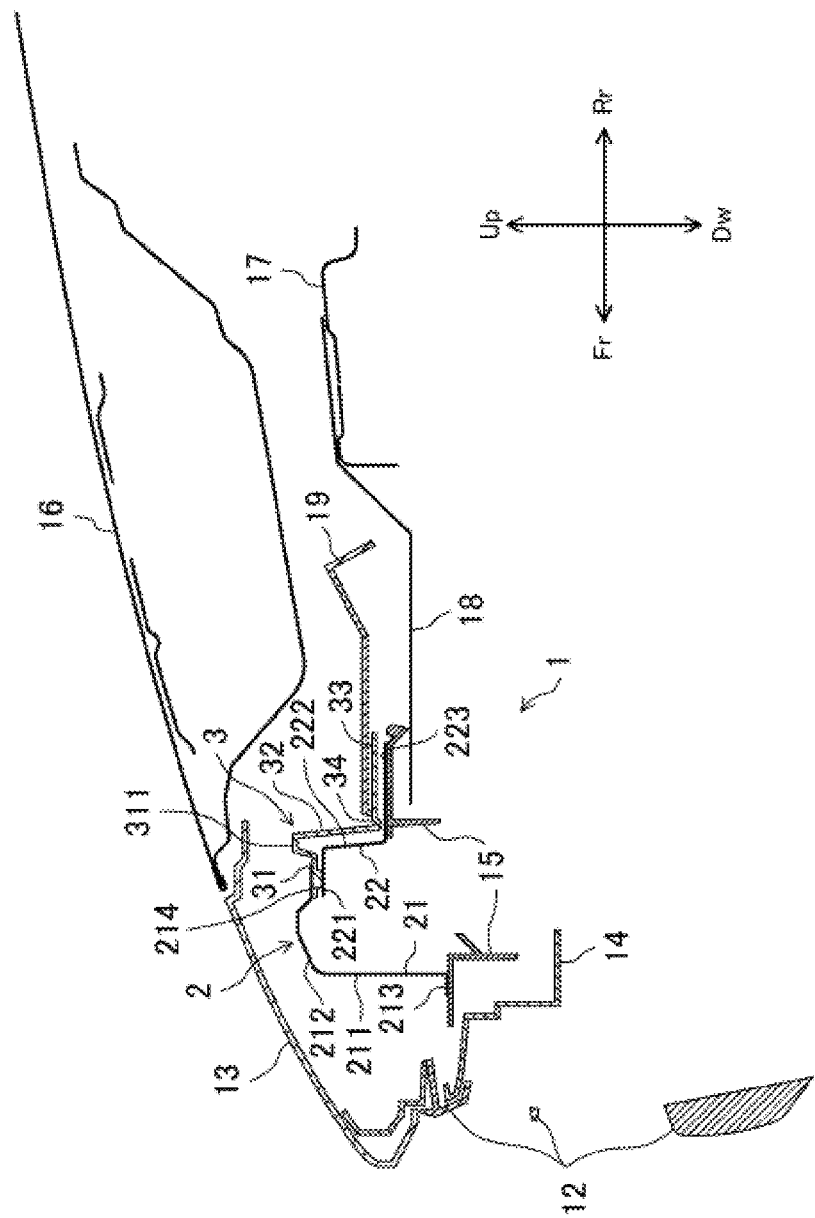
FIG. 1 is a side end view of a vehicle-body front portion including a front bumper in an embodiment.
Figure 2:
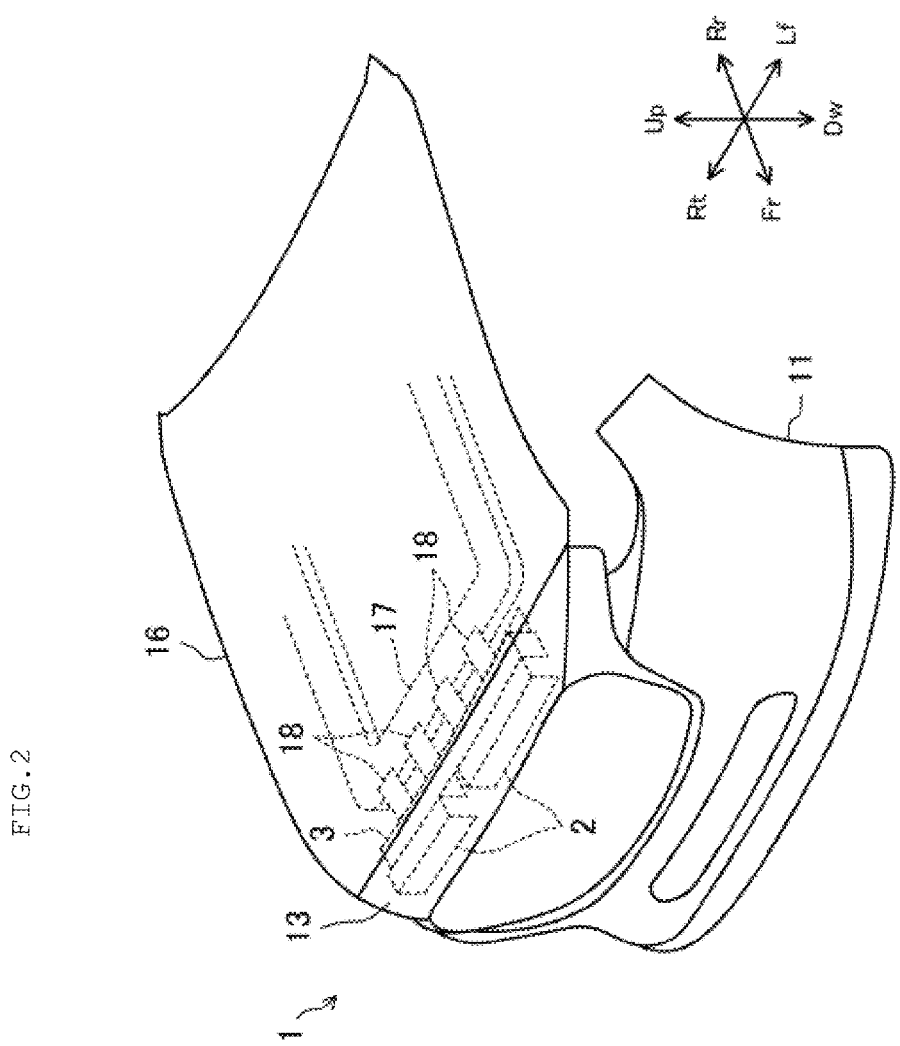
FIG. 2 is a perspective view illustrating the vehicle-body front portion of an embodiment.

FIG. 1 is a vertical cross-sectional view of a vehicle-body front portion including a front bumper 1 as viewed from the side, and FIG. 2 is a perspective view of the vehicle-body front portion. For example, the vehicle is an SUV having a relatively high vehicle height and a relatively large body size. Accordingly, the height from the ground to a bonnet upper face is relatively high.

A bumper fascia 11 is disposed at the vehicle-body front portion. A front grille 12 is provided at a center portion of the bumper fascia 11 in the vehicle width direction (see FIG. 1). An upper panel 13 is disposed on the upper side of the center portion of the bumper fascia 11 substantially in the vehicle width direction (Rt to Lf or right-left direction). The upper panel 13 extends substantially in the vehicle width direction. The upper panel 13 forms an upper edge of the front grille 12.

The front grille 12 is supported on a grille reinforcement 14. It should be noted that reference numeral 15 in FIG. 1 denotes a grille bracket. The grille bracket 15 extends along in the vehicle width direction.

A bonnet 16 is provided on the vehicle rear side of the upper panel 13. The bonnet 16 and the upper panel 13 form an upper face of the vehicle-body front portion. An engine room is formed below the bonnet 16. Furthermore, an upper frame 17 is disposed below the bonnet 16. The upper frame 17 extends in the vehicle width direction as indicated by a broken line in FIG. 2, bends at both end portions thereof in the vehicle width direction, and extends toward the vehicle rear side.

As illustrated in FIG. 1, the grille bracket 15 is supported on the upper frame 17 via a bumper support portion 18. As illustrated in FIG. 2, four bumper support portions 18 may be provided spaced apart from each other in the vehicle width direction, and each of the bumper support portions 18 extends toward the vehicle front side from a front end portion of the upper frame 17. A front end portion of each of the bumper support portions 18 is fixed to the grille bracket 15. A rear end portion of each of the bumper support portions 18 is fixed to the upper frame 17. The front bumper 1 including the grille bracket 15 is supported on the upper frame 17 via the bumper support portion 18. The bumper support portion 18 may support the front bumper 1 in a cantilever state.

A shock absorbing member 2 and a rigidity member 3 are disposed inside the upper panel 13 forming an upper portion of the front bumper 1. The shock absorbing member 2 extends in the vehicle width direction along the upper panel 13. In particular, the shock absorbing member 2 may completely overlap the upper panel 13 along a vehicle height direction (Up to Dw or up-down direction). The rigidity member 3 extends in the vehicle width direction on the back side of the shock absorbing member 2 along the shock absorbing member 2. In particular, the rigidity member 3 may partially overlap the upper panel 13 along a vehicle height direction (Up to Dw) and may extend from the shock absorbing member 2 toward a rear of the vehicle. Reference numeral 19 illustrated in FIG. 1 denotes a latch cover.

Figure 3:
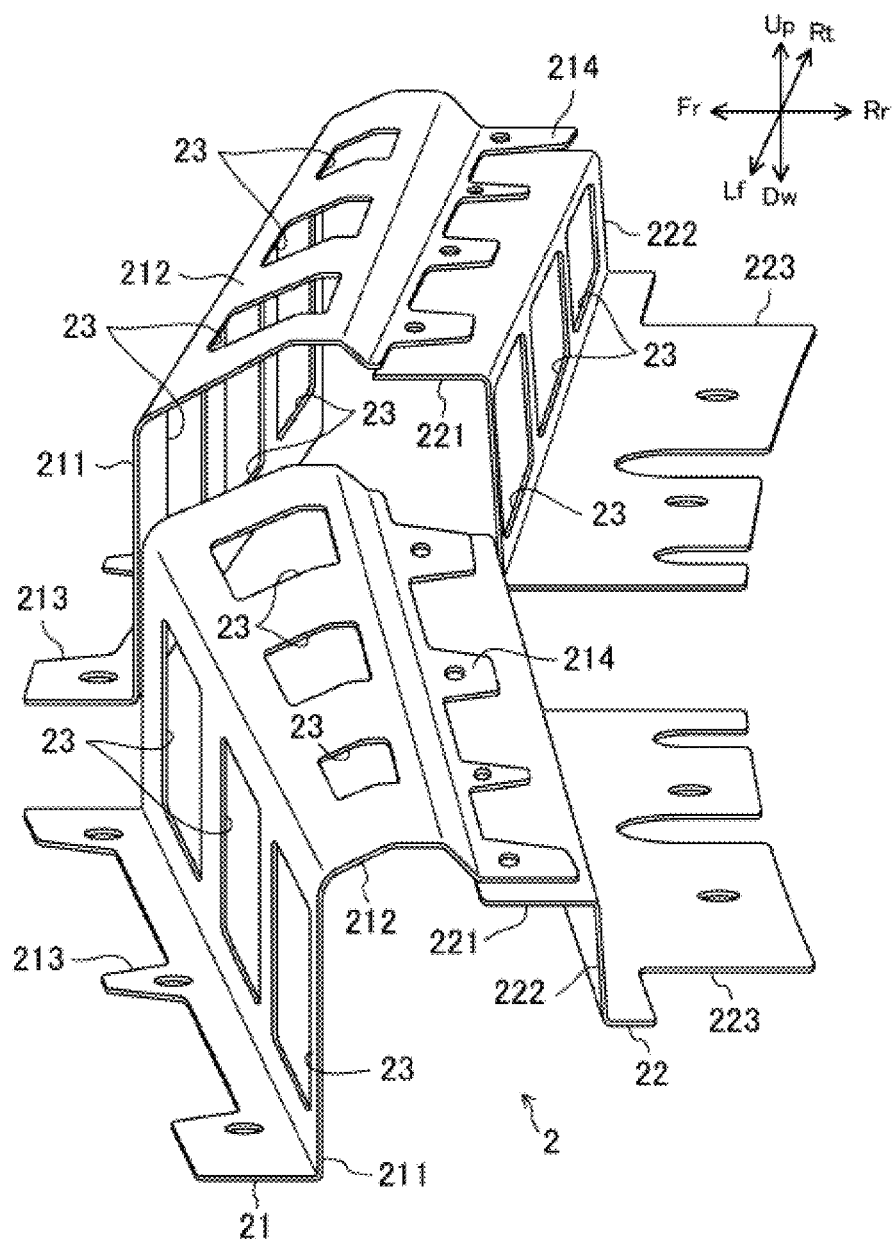
FIG. 3 is a perspective view illustrating a shock absorbing member of an embodiment.

The shock absorbing member 2 may be supported on the grille bracket 15. The shock absorbing member 2 may be placed on the grille bracket 15. As also illustrated in FIG. 3, the shock absorbing member 2 may have a front-side shock absorbing member 21 and a rear-side shock absorbing member 22. The rear-side shock absorbing member 22 is disposed on the back side of the front-side shock absorbing member 21. Each of the front-side shock absorbing member 21 and the rear-side shock absorbing member 22 may be separated into a section on the right side and a section on the left side in the vehicle width direction. Each of the front-side shock absorbing member 21 and the rear-side shock absorbing member 22 on the right side and each of the front-side shock absorbing member 21 and the rear-side shock absorbing member 22 on the left side may be disposed obliquely with respect to the front-rear direction (Fr to Rr or length direction) along a front end edge of the vehicle body.

The front-side shock absorbing member 21 may include a front wall 211 and a front-side upper wall 212. The front wall 211 stands perpendicularly or substantially perpendicularly upward from an upper face of the grille bracket 15 and extends in the vehicle width direction. A lower end of the front wall 211 is provided with a fixing portion 213 for fixing to the grille bracket 15.

The front-side upper wall 212 may be continuous with an upper end of the front wall 211. The front-side upper wall 212 extends toward the vehicle rear side from the upper end of the front wall 211. The front-side upper wall 212 is curved to project upward when viewed from the side. A rear end of the front-side upper wall 212 may include a connection portion 214 connected to a rear-side upper wall 221, which will be described later, via the rigidity member 3 such that the connection portion 214 protrudes toward the vehicle rear side. The connection portion 214 may be formed in a comb-teeth shape as illustrated in FIG. 3.

The rear-side shock absorbing member 22 may include the rear-side upper wall 221, a rear wall 222, and a lower wall 223. The rear-side upper wall 221 may overlap the lower side of the connection portion 214 of the front-side upper wall 212 and may be connected and fixed to the connection portion 214. The rear-side upper wall 221 spreads horizontally or almost horizontally toward the vehicle rear side, different from the front-side upper wall 212.

The rear wall 222 may be continuous with a rear end of the rear-side upper wall 221. The rear wall 222 stands perpendicularly or substantially perpendicularly upward from the upper face of the grille bracket 15 and extends in the vehicle width direction. The lower wall 223 may be provided at a lower end of the rear wall 222. The lower wall 223 is a wall for fixing the rear-side shock absorbing member 22 to the grille bracket 15. The lower wall 223 extends toward the vehicle rear side from the lower end of the rear wall 222. The lower wall 223 may be longer in the front-rear direction than the fixing portion 213 of the front-side shock absorbing member 21.

The connection portion 214 of the front-side shock absorbing member 21 and the rear-side upper wall 221 of the rear-side shock absorbing member 22 may be connected to each other, so that the shock absorbing member 2 formed by the front-side shock absorbing member 21 and the rear-side shock absorbing member 22 has a hat shape or convex shape relative to a downward direction of the vehicle in transverse cross-section. That is, the front wall 211 and the rear wall 222 may be spaced apart from each other in the vehicle front-rear direction, and the upper end of the front wall 211 and an upper end of the rear wall 222 may be coupled to each other by the front-side upper wall 212 and the rear-side upper wall 221.

Here, an opening 23 may be in each of the front wall 211, the front-side upper wall 212, and the rear wall 222 in the shock absorbing member 2. A plurality of the openings 23 may be formed side by side in the vehicle width direction in each of the front wall 211, the front-side upper wall 212, and the rear wall 222. The openings 23 may provide weight reduction of the shock absorbing member 2 and reduce rigidity of each of the front wall 211, the front-side upper wall 212, and the rear wall 222, thereby promoting deformation at the time of collision and enhancing the shock absorbing effect.

Furthermore, the opening area of the opening 23 provided in the front wall 211 may be larger than the opening area of the opening 23 provided in the front-side upper wall 212. With this, at the time of collision, the front wall 211 is more easily deformed than the front-side upper wall 212.

Furthermore, the plate thickness of the front-side shock absorbing member 21 may be smaller than the plate thickness of the rear-side shock absorbing member 22. Thus, the front-side shock absorbing member 21 is lower in rigidity and more easily deformed than the rear-side shock absorbing member 22.

Figure 4:
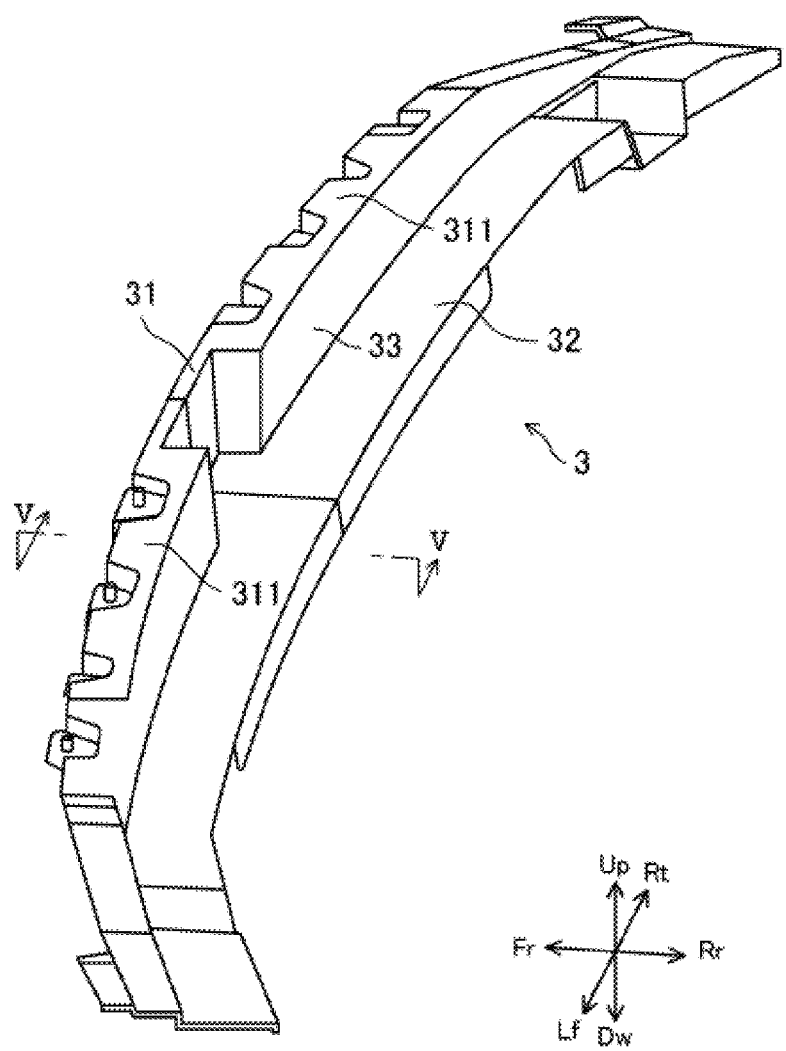
FIG. 4 is a perspective view illustrating a rigidity member of an embodiment.
Figure 5:
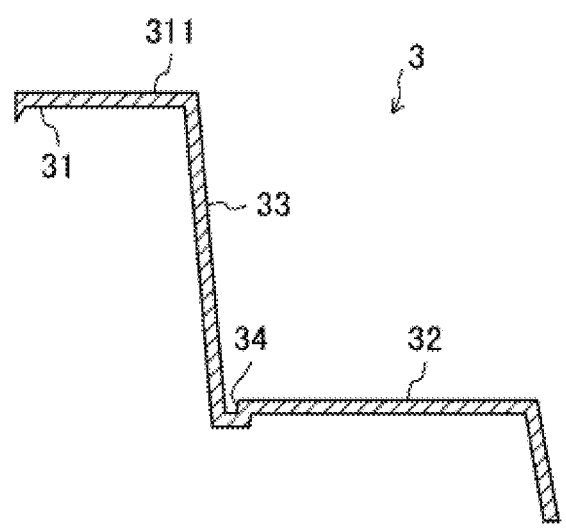
FIG. 5 is an end view taken along V-V in FIG. 4.
Figure 5:
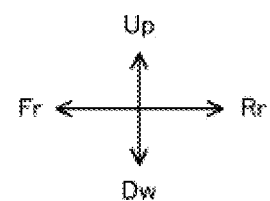

FIG. 4 is a perspective view of the rigidity member 3, and FIG. 5 is an end view of the rigidity member 3. The rigidity member 3 includes an upper end portion 31, a lower end portion 32, and an intermediate portion 33. The upper end portion 31 is fixed to an upper wall of the shock absorbing member 2. More specifically, the upper end portion 31 is interposed in the up-down direction between the connection portion 214 of the front-side shock absorbing member 21 and the rear-side upper wall 221 of the rear-side shock absorbing member 22 and is fixed to each of the connection portion 214 and the rear-side upper wall 221 (see FIG. 1). The connection portion 214 and the rear-side upper wall 221 of the shock absorbing member 2 and the upper end portion 31 of the rigidity member 3 overlap with each other along the vehicle height direction.

The upper end portion 31 may have protrusions 311 protruding upward. As illustrated in FIG. 1, the protrusions 311 may protrude to a position at almost the same height as or a position higher than an upper end of the front-side upper wall 212 of the front-side shock absorbing member 21.

The lower end portion 32 may be fixed to the lower wall 223 of the shock absorbing member 2. More specifically, the lower end portion 32 may be fixed to the lower wall 223 in a state of overlying the lower wall 223 along the vehicle height direction. The lower end portion 32 may spread in a face shape toward the vehicle rear side, e.g., may be convex towards a downward side. As illustrated in FIG. 1, a rear end of the lower end portion 32 is located on the vehicle rear side relative to a rear end of the lower wall 223.

The intermediate portion 33 connects a rear end of the upper end portion 31 and a front end of the lower end portion 32. More specifically, the intermediate portion 33 connects a rear end of the protrusion 311 of the upper end portion 31 and the front end of the lower end portion 32. The intermediate portion 33 perpendicularly or substantially perpendicularly spreads in a face shape. The rigidity member 3 formed by the upper end portion 31, the lower end portion 32, and the intermediate portion 33 has a substantially Z-shaped transverse cross-sectional shape.

As illustrated in FIG. 1, the intermediate portion 33 may be spaced apart from the rear wall 222 of the shock absorbing member 2 toward the vehicle rear side. With this, a closed cross-section is formed between the rear wall 222 of the rear-side shock absorbing member 22 and the intermediate portion 33 of the upper end portion 31 of the rigidity member 3.

The intermediate portion 33 spreading in a face shape and the lower end portion 32 spreading in a face shape are connected via a bent portion 34. A cutout may be formed in the bent portion 34. The cutout is recessed from an upper face of the lower end portion 32 as illustrated in FIG. 5 and extends in the vehicle width direction along a lower end of the intermediate portion 33.

Next, a function of the front bumper 1 with the above configuration will be described with reference to FIG. 6. The front bumper 1 includes the shock absorbing member 2 and the rigidity member 3 inside the upper panel 13. As illustrated in FIG. 1, the shock absorbing member 2 is at a position from an intermediate portion of the upper panel 13 in the front-rear direction to a rear end portion of the upper panel 13, and the rigidity member 3 is at a position from the rear end portion of the upper panel 13 to a front end portion of the bonnet 16.

The shock absorbing member 2 and the rigidity member 3 may both have a low rigidity that allows energy absorption through deformation with respect to a load from the vehicle front side or the obliquely upper side of the front side at the time of collision, and a high rigidity that does not allow deformation with respect to a load from the vehicle upper side.

Figure 6:
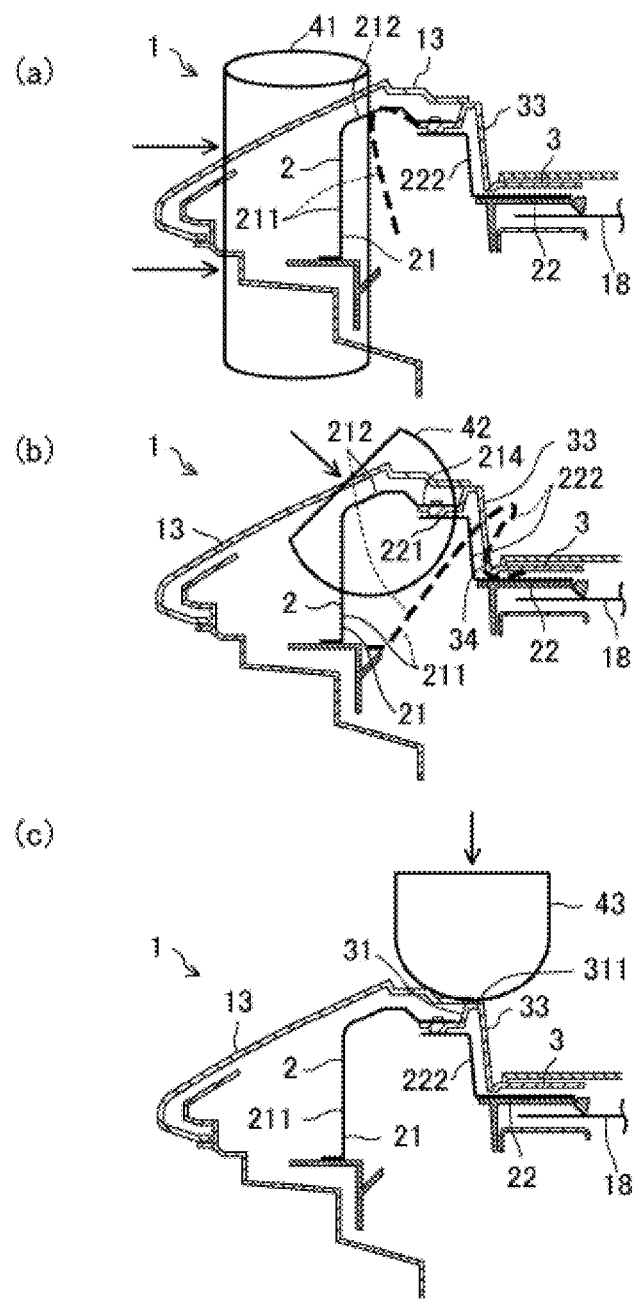
FIG. 6 is a side cross-sectional view illustrating a collision mode of an embodiment.

First, (a) in FIG. 6 illustrates an example of a case where a pedestrian collides with a vehicle front portion from the front side. As described above, this example vehicle is an SUV having a relatively large body size and a relatively high height from the ground to the bonnet upper face. Accordingly, a thigh 41 of the pedestrian almost perpendicularly collides with the vehicle from the front side. The thigh 41 hits the front wall 211 of the shock absorbing member 2. The front wall 211 is provided with the plurality of openings 23 and thus has a low rigidity. Moreover, the opening 23 of the front wall 211 has a larger opening area than the opening 23 of the front-side upper wall 212. The front wall 211 is deformed to be bent at a corner portion between the front wall 211 and the front-side upper wall 212 and is inclined toward the vehicle rear side (see a broken line in (a) of FIG. 6). At this time, a space is provided between the front wall 211 and the rear wall 222, and thus the rear wall 222 does not prevent deformation of the front wall 211 toward the vehicle rear side. The intermediate portion 33 of the rigidity member 3 is disposed further behind the rear wall 222, and thus the rigidity member 3 also allows deformation of the front wall 211 toward the vehicle rear side. Thus, the shock absorbing member 2 is deformed with respect to the collision from the front side, thereby absorbing the shock.

The front-side shock absorbing member 21 having a relatively small plate thickness is more easily deformed than the rear-side shock absorbing member 22. Accordingly, at the time of the collision with the thigh 41, the front-side shock absorbing member 21 is deformed while moving toward the vehicle rear side. The deformation of the front-side shock absorbing member 21 can reduce the load right after the collision.

Next, (b) in FIG. 6 illustrates an example of a case where a short pedestrian, for example, a child collides with the vehicle front portion from the front side. In this case, a head 42 obliquely downwardly collides with the vehicle from the obliquely upper side of the front side. The head 42 hits the front wall 211 and the front-side upper wall 212 of the shock absorbing member 2. Each of the front wall 211 and the front-side upper wall 212 is provided with the plurality of openings 23 and thus has a low rigidity. Furthermore, the front-side upper wall 212 is curved to project upward. The front wall 211 and the front-side upper wall 212 are both deformed to fall toward the vehicle rear side.

The connection portion 214 of the front-side shock absorbing member 21 and the rear-side upper wall 221 of the rear-side shock absorbing member 22 are connected, and thus a load input to the front-side shock absorbing member 21 is input to the rear-side shock absorbing member 22 through the upper wall. A bending moment toward the vehicle rear side occurs in a lower end portion of the rear wall 222, and thus the rear wall 222 of the rear-side shock absorbing member 22 also falls rearward (see a broken line in (b) in FIG. 6).

In association with the entire shock absorbing member 2 falling rearward, the intermediate portion 33 of the rigidity member 3 is pushed rearward by the shock absorbing member 2. Furthermore, the rigidity member 3 is fixed such that the upper end portion 31 is superimposed on the upper wall of the shock absorbing member 2. When a load is input to the shock absorbing member 2, the load is input to the upper end portion of the rigidity member 3, and thus a bending moment toward the vehicle rear side occurs in the bent portion 34 of the rigidity member 3.

A notch in the bent portion 34 may be provided between the intermediate portion 33 and the lower end portion 32 of the rigidity member 3, and thus the intermediate portion 33 easily falls rearward using the bent portion 34 as a starting point. Thus, the shock absorbing member 2 and the rigidity member 3 are deformed with respect to the collision from the obliquely upper side, thereby absorbing the shock.

Furthermore, the plate thickness of the front-side shock absorbing member 21 may be less than the plate thickness of the rear-side shock absorbing member 22 and the openings 23 in the front-side shock absorbing member 21 makes it easier for the front-side shock absorbing member 21 to be deformed relative to the rear-side shock absorbing member 22. Thus, at the time of the collision with the head 42, a large area of the head 42 contacts the upper wall of the shock absorbing member 2, so that the collision load can be dispersed.

Furthermore, with respect to the collision from the obliquely upper side, both of the front-side shock absorbing member 21 and the rear-side shock absorbing member 22 are deformed so as to fall toward the vehicle rear side, so that the energy absorbing stroke can be made long diagonally with respect to the shock absorbing member 2 having a hat shape in cross section, and the shock to the pedestrian can be reduced.

Furthermore, the front bumper 1 may be, in a cantilever state, supported on the bumper support portion 18 extended toward the vehicle front side from the upper frame 17. When a shock is input to the upper panel 13 from the front side or the obliquely upper side of the front side, the bumper support portion 18 bends and thereby the shock is absorbed. Absorption of shock energy can be achieved in a manner involving the vehicle-body structure as well as the front bumper 1.

An example of a case where a load is downwardly input to the upper panel 13 from the vehicle upper side by, for example, a body 43 of a worker, is illustrated in (c) of FIG. 6. At a position corresponding to the rear end portion of the upper panel 13, a closed cross-section is formed by the rear wall 222 of the shock absorbing member 2 and the intermediate portion 33 of the rigidity member 3. The load downwardly applied from the upper side is input to the upper end portion 31 of the rigidity member 3, more accurately, the protrusion 311 located at the uppermost side, while the shock absorbing member 2 and the rigidity member 3, with the closed cross-section structure, can exhibit a high rigidity with respect to a load in the up-down direction. As a result, even in the case where the worker, when performing maintenance inside the engine room while opening the bonnet 16, places his/her weight on the upper panel 13 from the vehicle upper side, it is possible to avoid a situation where the upper panel 13 is deformed.

It should be noted that the above-described embodiment is merely illustrative and must not be interpreted as limiting the scope of the present invention. The scope of the present invention is defined by the claims, and modifications and changes which belong to the equivalent scope of the claims are all within the scope of the present invention.

REFERENCE SIGNS LIST 1 front bumper
11 bumper fascia
13 upper panel
17 upper frame
18 bumper support portion
2 shock absorbing member
21 front-side shock absorbing member
211 front wall
212 front-side upper wall
22 rear-side shock absorbing member
221 rear-side upper wall
222 rear wall
223 lower wall
3 rigidity member
31 upper end portion
32 lower end portion
33 intermediate portion
34 bent portion

The invention claimed is:
1. A vehicle front bumper comprising:
a bumper fascia in a vehicle front face;
an upper panel on an upper side of a center portion of the bumper fascia; and a shock absorbing member and a rigidity member in an interior of the upper panel, wherein the shock absorbing member includes a hat shape in cross section formed by a front wall extending toward a vehicle upper side over a vehicle width direction, an upper wall extending toward a vehicle rear side from an upper portion of the front wall, a rear wall extending toward a vehicle lower side from a rear portion of the upper wall, and a lower wall extending toward the vehicle rear side from a lower portion of the rear wall, and the rigidity member includes an upper end portion fixed to the upper wall, a lower end portion fixed to the lower wall, and an intermediate portion connecting the upper end portion and the lower end portion in a vehicle up-down direction, and the intermediate portion is spaced apart from the rear wall in a vehicle front-rear direction.

2. The vehicle front bumper according to claim 1, wherein the rigidity member extends in the vehicle width direction along the shock absorbing member, and the intermediate portion extends in a face shape in the vehicle up-down direction, the lower end portion extends in a face shape toward the vehicle rear side, and the intermediate portion and the lower end portion are connected via a bent portion.

3. The vehicle front bumper according to claim 2, wherein the bent portion includes a cutout.

4. The vehicle front bumper according to claim 3, wherein the shock absorbing member is formed by a front-side shock absorbing member including the front wall and a rear-side shock absorbing member including the rear wall, and the front-side shock absorbing member and the rear-side shock absorbing member are superimposed on each other at the upper wall and fixed together with the upper end portion.

5. The vehicle front bumper according to claim 4, wherein a plate thickness of the front-side shock absorbing member is smaller than a plate thickness of the rear-side shock absorbing member.

6. A vehicle-body structure comprising:
the vehicle front bumper according to claim 5; and
a bumper support supporting the vehicle front bumper, wherein the bumper support has a first end fixed to a vehicle-body upper frame extending in a vehicle width direction on a vehicle rear side relative to the shock absorbing member, and a second end fixed to the vehicle front bumper at a position away from the vehicle-body upper frame toward a vehicle front side.

7. A vehicle-body structure comprising:
the vehicle front bumper according to claim 4; and
a bumper support supporting the vehicle front bumper, wherein the bumper support has a first end fixed to a vehicle-body upper frame extending in a vehicle width direction on a vehicle rear side relative to the shock absorbing member, and a second end fixed to the vehicle front bumper at a position away from the vehicle-body upper frame toward a vehicle front side.

8. A vehicle-body structure comprising:
the vehicle front bumper according to claim 3; and
a bumper support supporting the vehicle front bumper, wherein the bumper support has a first end fixed to a vehicle-body upper frame extending in a vehicle width direction on a vehicle rear side relative to the shock absorbing member, and a second end fixed to the vehicle front bumper at a position away from the vehicle-body upper frame toward a vehicle front side.

9. The vehicle front bumper according to claim 2, wherein the shock absorbing member is formed by a front-side shock absorbing member including the front wall and a rear-side shock absorbing member including the rear wall, and the front-side shock absorbing member and the rear-side shock absorbing member are superimposed on each other at the upper wall and fixed together with the upper end portion.

10. A vehicle-body structure comprising:
the vehicle front bumper according to claim 2; and
a bumper support supporting the vehicle front bumper, wherein the bumper support has a first end fixed to a vehicle-body upper frame extending in a vehicle width direction on a vehicle rear side relative to the shock absorbing member, and a second end fixed to the vehicle front bumper at a position away from the vehicle-body upper frame toward a vehicle front side.

11. The vehicle front bumper according to claim 1, wherein the shock absorbing member is formed by a front-side shock absorbing member including the front wall and a rear-side shock absorbing member including the rear wall, and the front-side shock absorbing member and the rear-side shock absorbing member are superimposed on each other at the upper wall and fixed together with the upper end portion.

12. A vehicle-body structure comprising:
the vehicle front bumper according to claim 1; and
a bumper support supporting the vehicle front bumper, wherein the bumper support has a first end fixed to a vehicle-body upper frame extending in a vehicle width direction on a vehicle rear side relative to the shock absorbing member, and a second end fixed to the vehicle front bumper at a position away from the vehicle-body upper frame toward a vehicle front side.

* * * * *